United States Patent
Decker (10) Patent No.: US 6,176,495 B1
(45) Date of Patent: *Jan. 23, 2001

(54) HYDRAULIC LEVELING SYSTEM FOR MOBILE STAGE VEHICLE

(75) Inventor: Matthew J. Decker, Owatonna, MN (US)

(73) Assignee: Wenger Corporation, Owatonna, MN (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/208,710

(22) Filed: Dec. 10, 1998

Related U.S. Application Data (63) Continuation of application No. 08/890,761, filed on Jul. 11, 1997, now abandoned, which is a continuation of application No. 08/794,397, filed on Feb. 5, 1997, now abandoned, which is a continuation of application No. 08/404,724, filed on Mar. 15, 1995, now abandoned.

(51) Int. Cl.$^7$ .............................................. B60S 9/02
(52) U.S. Cl. ................................................ 280/6.153
(58) Field of Search .................... 280/6.15, 6.153, 280/6.154, 6.155

(56) References Cited

U.S. PATENT DOCUMENTS

| | | |
|---|---|---|
| 2,155,876 | 4/1939 | Stout . |
| 3,181,203 | 5/1965 | Wenger . |
| 3,258,884 | 7/1966 | Wenger . |
| 3,417,518 | 12/1968 | Jaffe . |
| 3,620,564 | 11/1971 | Wenger et al. . |
| 3,866,365 | 2/1975 | Honigman . |
| 4,232,488 | 11/1980 | Hanley . |
| 4,568,096 | 2/1986 | Yew et al. . |
| 4,572,527 | 2/1986 | Stafford-Mills et al. . |
| 4,743,037 | 5/1988 | Hanser . |
| 4,746,133 | 5/1988 | Hanser et al. . |
| 4,784,400 | 11/1988 | Hofius . |
| 5,078,442 | 1/1992 | Rau et al. . |
| 5,159,989 | 11/1992 | Claxton . |
| 5,176,391 | 1/1993 | Schneider et al. . |
| 5,188,379 | 2/1993 | Krause et al. . |
| 5,676,385 | * 10/1997 | Schneider et al. ................ 280/6.1 |

FOREIGN PATENT DOCUMENTS 1-197139   8/1989   (JP) .

OTHER PUBLICATIONS

Wenger, The Great Outdoors, 1988 Brochure.

* cited by examiner

Primary Examiner—Paul N. Dickson
(74) Attorney, Agent, or Firm—Patterson, Thuente, Skaar & Christensen, P.A.

(57) ABSTRACT

A leveling system for use with a mobile stage vehicle, the mobile stage vehicle having a stage floor. The leveling system includes a hydraulic actuation system. A plurality of leveling devices are coupled to the mobile stage vehicle of the portable stage for the leveling thereof. A hydraulic control system is coupled to the hydraulic actuation system for the control of the hydraulic actuation system. The hydraulic control system has level sensor devices coupled to the mobile stage vehicle for detecting the inclination of the mobile stage vehicle and indicators means coupled to the level sensor devices for presenting a viewable indication of the level status of the mobile stage vehicle. A switch is coupled to the hydraulic actuation system for providing a command to the hydraulic actuation system whereby the leveling devices are actuated responsive to an out of level indication on the indicators to effect leveling of the stage floor of the mobile stage vehicle.

9 Claims, 5 Drawing Sheets

HYDRAULIC LEVELING SYSTEM FOR MOBILE STAGE VEHICLE

This is a continuation of application Ser. No. 08/890,761 filed Jul. 11, 1997, which in turn is a continuation of application Ser. No. 08/794,397 filed Feb. 5, 1997, which in turn is a continuation of 08/404,724 filed Mar. 15, 1995 all abandoned.

TECHNICAL FIELD

A hydraulic leveling system for use with a mobile stage vehicle. More particularly, a manually operated hydraulic leveling system that acts upon ground engaging jacks positioned at the four corners of the chassis of the mobile stage vehicle to level the stage area.

BACKGROUND OF THE INVENTION

Mobile stage vehicles are typically mounted on a rolling chassis and are towed to the site of a performance by a powered vehicle, such as a pickup truck or the like. The mobile stage vehicle is typically set up for a performance or event of relatively short duration and is then dismantled and removed from the performance site for storage. Such mobile stage vehicles may comprise a stage area. Certain of such mobile stage vehicle additionally have deployable canopies and stage sections that comprise shiftable components having substantial mass. It is desirable for individuals performing on the stage that the stage provide a level platform. There is a need to have the chassis of the portable stage vehicle level in order to adequately balance the weight of a deployable canopy and to provide a level reference to insure that an adjoining deployable stage section is flush with the fixed stage portion that is borne by the chassis.

Presently, mobile stage vehicles include ground engaging, variable length jacks to provide a leveling capability. A jack is typically associated with each of the four corners of the chassis of the mobile stage vehicle. An operator utilizes a manual crank to extend or retract each such jack individually. Leveling is done with either a carpenter's level or level bubbles built into the chassis. Achieving a level condition of the stage is an iterative, time consuming exercise because of the interdependence of an out of level condition at one corner of the chassis with one or two adjacent corners, whereby altering the length of one jack affects the level condition of adjacent corners. The jack at each corner of the chassis may be individually actuated by a hydraulic control at the corner. While this eliminates the need for hand cranking the jacks, it does not affect the iterative problem of levelling the chassis through independent actuation of the jacks at the four corners of the chassis.

It would be a decided advantage in industry to have a hydraulically actuated leveling system that would permit leveling of the stage area from a single hydraulic command unit, as distinct from separately leveling each corner (whether by manually cranking the jack up or down or actuating it hydraulically). Additionally, such hydraulic leveling system should provide feedback to the operator of an in level/out level condition. To enhance the safety of the operation, the hydraulic command unit should be physically located away from the chassis of the portable stage so that while major components of the mobile stage vehicle, such as the canopy and deployable stage section, are being actuated.

SUMMARY OF THE INVENTION

The present invention substantially satisfies the above industry needs for a hydraulic actuated leveling system for a mobile stage vehicle. The hydraulic leveling system of the present invention utilizes a single hydraulic handheld command unit for all hydraulic functions, including raising and lowering the deployable stage, raising and lowering the canopy, and leveling of the chassis. The hydraulic command unit utilizes a lengthy power cord that is attached to a receptacle in the chassis of the portable stage. Thus, actuation of any of the hydraulic functions by an operator is permitted at a substantial distance from the mobile stage vehicle in order to increase the safety of the operator. The hydraulic command unit is relatively simple to use, prompting commands that affect leveling responsive to indicator lights that indicate a low condition for a corner with respect to the other corners or a low condition of one side with respect to the parallel, opposed side of the chassis. An indicator light and control is provided corresponding to each corner of the mobile stage vehicle chassis.

DETAILED DESCRIPTION OF THE DRAWINGS

Figure 1:
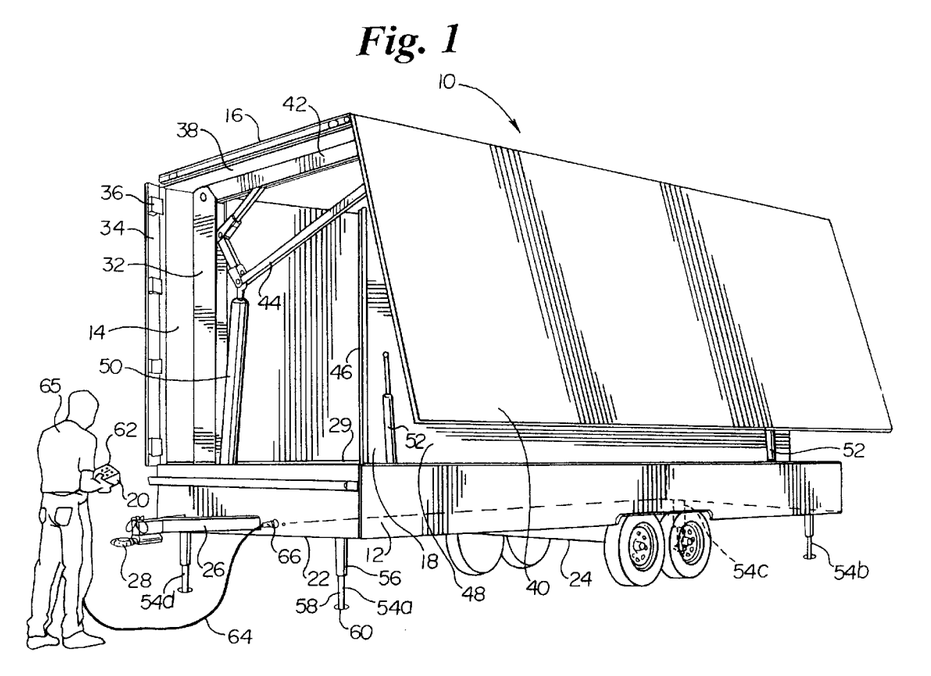
FIG. 1 is a perspective view of an operator using the hydraulic command unit to deploy the canopy of the portable stage.

A mobile stage vehicle is shown generally at 10 in FIG. 1. The convention for naming the sides of the portable stage relates to the portable stage as it is towed and typically parked on a street for a performance. Accordingly, the front of the portable stage is the side with the tongue protruding therefrom. The rear of the portable stage is the side that is opposed to the front thereof. The curb side is the side to a viewer's right when a viewer is standing facing forward in the direction that the stage vehicle 10 is towed and the road side is to the viewer's left as the viewer stands facing forward.

The mobile stage vehicle 10 has five major subcomponents: chassis 12, backwall 14, canopy 16, hydraulic stage 18, and hydraulic control system 20.

The chassis 12 of the mobile stage vehicle 10 is comprised of a frame 22. A pair of wheel and axle sets 24 are mounted by suitable suspension (not shown) to frame 22. A tongue 26 is affixed to the front of the chassis 12. The tongue 26 has a lunette type hitch 28 affixed to the end thereof. The hitch 28 is designed to receive a pintle type hitch mounted on a towing vehicle. A stage floor 29 forms the upper surface of chassis 12.

The backwall 14 is formed of a composite panel affixed structurally to a pair of upright standards 32. When the mobile stage vehicle 10 is configured for transporting, the backwall 14 forms the curbside side of the mobile stage vehicle 10. When the mobile stage vehicle 10 is configured for giving a performance, the backwall 14 forms the backdrop of the stage area.

The upright standards 32 are structural weight bearing members that are structurally tied into the chassis 12 of mobile stage vehicle 10. A front panel 34 is mounted by hinge or hinges 36 of the side margin of backwall 14. In FIG. 1, front panel 34 is swung around out of view behind backwall 14. When in the towed configuration, front panel 34 comprises the front of mobile stage vehicle 10. It is understood that a rear panel (not shown) is attached to the rear margin of backwall 14 in a manner similar to that of the front panel 34. When the mobile stage vehicle 10 is in the towed configuration, the rear panel comprises the rear of mobile stage vehicles 10. The front panel 34 and the rear panel may be deployed at various angles with respect to the backwall 14 during performances to provide a clamshell type effect behind the performers and to help project the sound toward the audience.

Canopy 16 is articulated and is comprised of a lower canopy panel 38 and an upper canopy panel 40. The upper canopy panel 40 is hinged to the lower canopy panel 38. The stiffener 42 provides rigidity to the lower canopy panel 38. Similar stiffeners (not shown) are typically provided for the upper canopy panel 40. Actuation system 44 is used to raise and lower the lower canopy panel 38 and upper canopy panel 40 and to set the angle therebetween as desired. The actuation system 44 typically is comprised of a linkage system that is designed to simultaneously deploy the lower canopy panel 38 and the upper canopy panel 40.

The hydraulic stage 18 is depicted in FIG. 1 in its upright towed configuration. Subsequent to raising canopy 16, the hydraulic stage 18 is rotated approximately 90 degrees to where the moveable stage floor 46 is coplanar with stage floor 29, forming an adjunct stage surface thereto. In the deployed, adjunct position, the stage floor underside 48 is facing downward. A series of hinges (not shown) are provided along the lower margin of the hydraulic stage 18 to facilitate this rotation.

The hydraulic actuation system 20 is comprised of an electrically powered hydraulic pump (not shown) that is hydraulically connected to the canopy actuators 50, the stage actuator 52, and the leveling jacks 54. The components that comprise the hydraulic actuation system 20, such as the pump, motor, hydraulic reservoir, valving, and the hydraulic lines, are typically housed beneath the stage floor 29. The canopy actuator 50 is depicted in FIG. 1 and is comprised of a hydraulic cylinder and piston. The lower end of the canopy actuator 50 is pivotally connected to upright standard 32. A similar canopy actuator 50 (not shown) is located proximate the rearmost portion of stage vehicle 10 along side the backwall 14. The canopy actuator 50 drives the actuation system 44 to raise and lower the canopy 16.

The stage actuator 52 is connected at one end to the road side margin of chassis 12. The second end of the stage actuator 52 is coupled to the stage floor underside 48 of the hydraulic stage 18. Typically two such stage actuators 52 are paired and located proximate the front and rear margins of the hydraulic stage 18 in order to deploy the deployable stage section 18. Each such stage actuator 52 is comprised of a hydraulic cylinder and piston.

There are four leveling jacks 54 associated with mobile stage vehicle 10. The four leveling jacks 54 are located one at each of the four corners of chassis 12. As depicted in FIG. 1, the leveling jacks 54 are comprised of leveling jack 54a, located at the road side front of chassis 12, leveling jack 54b, located at the road side rear of chassis 12, leveling jack 54c, located at the curb side rear of chassis 12, and leveling jack 54d, located at the curb side front of chassis 12.

The leveling jacks 54 are comprised of a hydraulic cylinder 56, a selectively retractable and extendable piston 58, and a ground engaging foot 60. For towing, the piston 58 is fully retracted so as not to drag over rises in the terrain over which the mobile stage vehicle 10 is transported.

Figure 2:
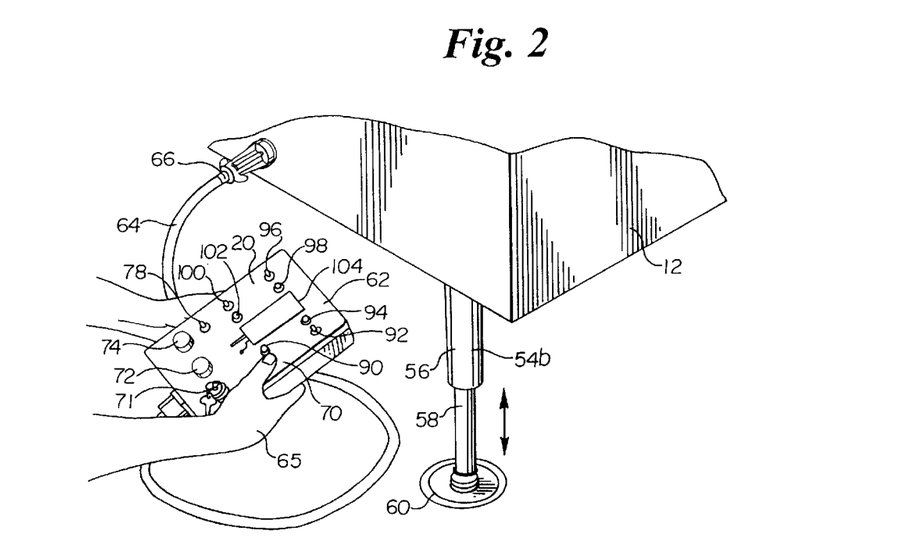
FIG. 2 is a perspective of the hydraulic control unit and the road side front hydraulic jack of the portable stage.
Figure 4:
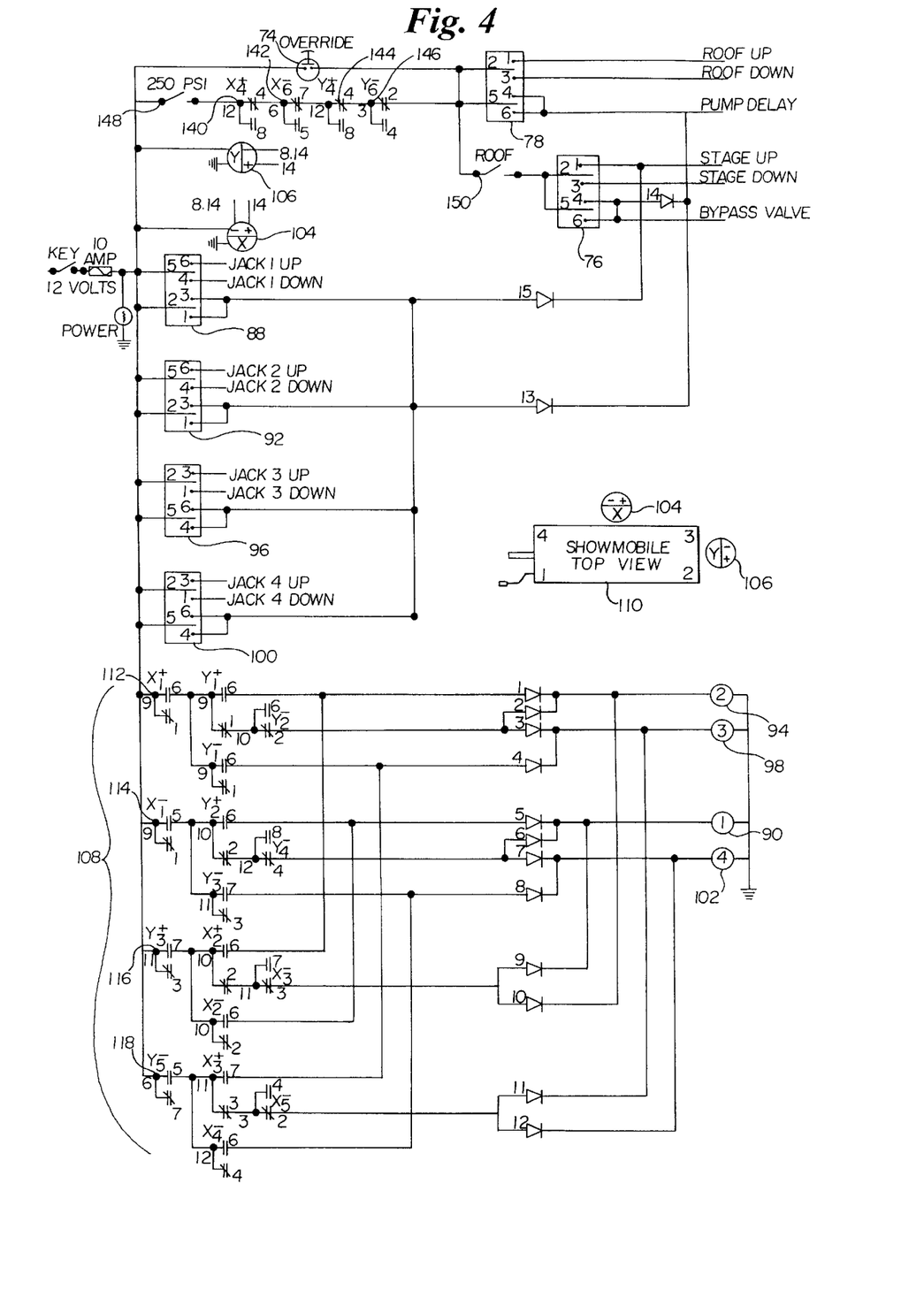
FIG. 4 is an electrical schematic of the hydraulic leveling controls in the initial, and level conditions.
Figure 5:
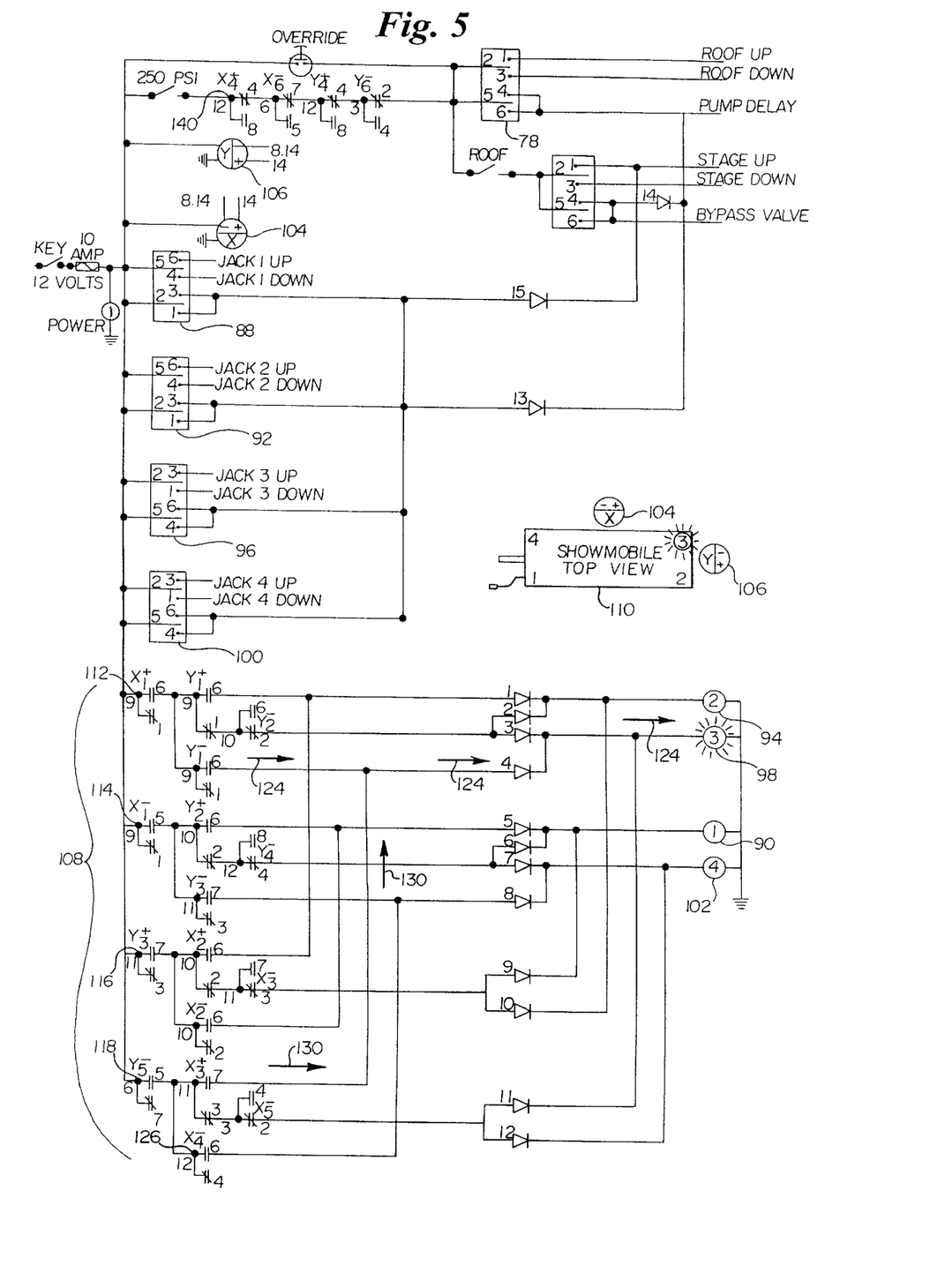
FIG. 5 is an electrical schematic of the hydraulic control system representing an X plus, Y minus out of level condition.
Figure 6:
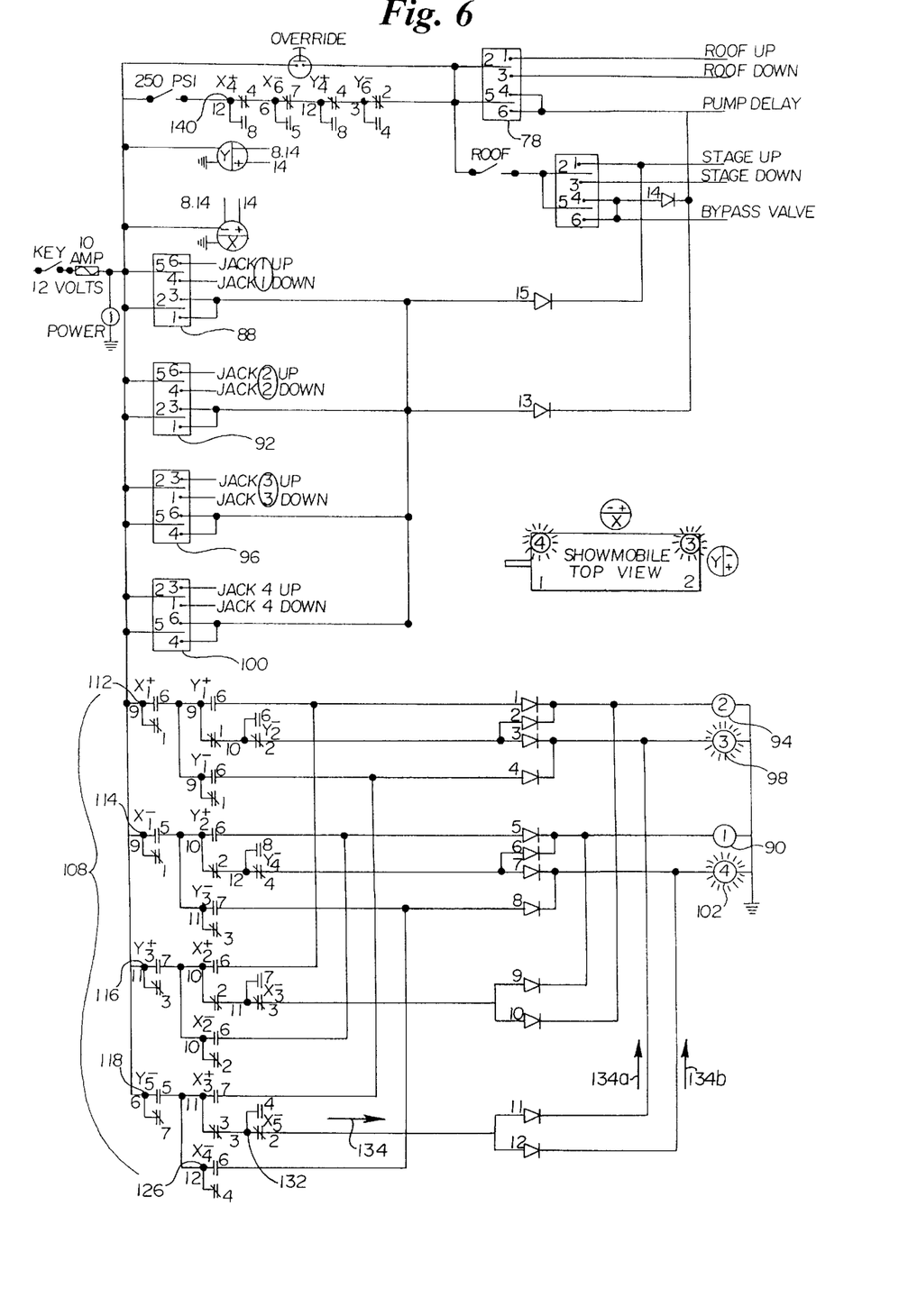
FIG. 6 is an electrical schematic of the hydraulic control system representing a Y minus out of level condition.

The hydraulic actuation system 20 also includes hydraulic control unit 62, as depicted in FIGS. 1 and 2. Disposed within the hydraulic control unit 62 is electric circuitry as depicted in the schematics of FIGS. 4–6 for controlling the aforementioned canopy actuators 50, stage actuators 52, and leveling jacks 54. It is understood that the canopy actuators 50 and stage actuators 52 are optional and that the leveling jacks 54 may be employed alone to level the chassis 12.

The hydraulic control unit 62 is electrically connected to the other components of the hydraulic actuation system 20 of mobile stage vehicle 10 by a power cable 64. The power cable 64 is preferably approximately 12 feet in length so that the hydraulic control unit 62 may be positioned a substantial distance from mobile stage vehicle 10 during hydraulic actuation of the various hydraulically actuated components, such as the aforementioned canopy actuators 50, stage actuators 52, and leveling jacks 54. The power cable 64 is electrically, communicatively attached to the hydraulic control system 20 via a quick disconnect connector 66. The connector 66 is inserted into a electrical receptacle (not shown) in the side of frame 22 of chassis 12. The quick disconnect connector 66 permits the hydraulic control unit 62 to be readily disconnected from frame 22 and stored away during towing of mobile stage vehicle 10 and at other times when actuation of the hydraulic actuation system 20 is not needed.

Figure 3:
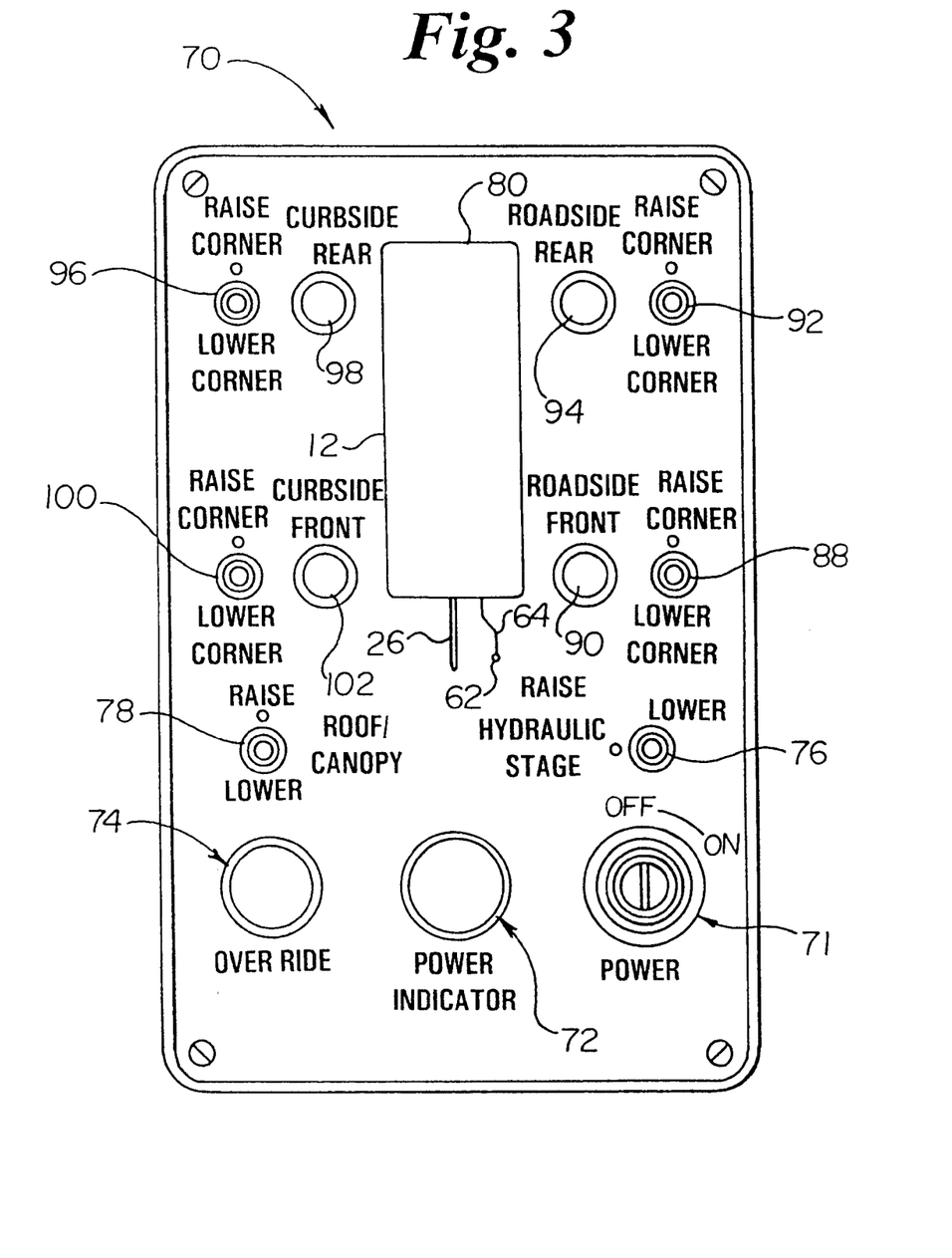
FIG. 3 is an elevational view of the face of the hydraulic command unit.

FIG. 3 depicts the face 70 of the hydraulic control unit 62, depicting the controls and indications available to the operator 65. A keyed power switch 71 is provided in order for the operator 65 to provide power to the hydraulic actuation system 20. When the power is on, the power indicator 72 is illuminated.

An override selector 74 is provided in order to permit actuation of the canopy 16 and the hydraulic stage 18 without respect to whether or not the chassis 12 has been leveled. A three position hydraulic stage toggle switch 76 permits the operator 65 to raise and lower the hydraulic stage 18. A similar three position canopy toggle switch 78 permits the operator 65 to raise and lower the canopy 16.

A chassis schematic 80 is etched on the face of the hydraulic control unit 62. The chassis schematic 80 is provided so that the operator 65 may readily orient himself with respect to the mobile stage vehicle 10 when the operator 65 is actuating the hydraulic actuation system 20. Accordingly, the chassis schematic 80 includes a representation of the chassis 12 with the tongue 26 affixed at the front thereof. Also, the hydraulic control unit 62 is represented in the chassis schematic 80 alongside the tongue 26. When operating the hydraulic actuation system 20, the operator 65 is always located proximate the road side front corner of the mobile stage vehicle 10, as depicted in FIGS. 1 and 2.

There is a three position toggle switch and an indicator light associated with each of the leveling jacks 54a–54d located on face 70. Toggle switch 88 and indicator 90 are associated with the road side front leveling jack 54a. Toggle switch 92 and indicator 94 are associated with the road side rear leveling jack 54b. Toggle switch 96 and indicator 98 are associated with the curb side rear leveling jack 54c and, toggle switch 100 and indicator 102 are associated with the curb side front of leveling jack 54d. The three positions of the toggle switches 88, 92, 96 and 100 are a center spring loaded inactive position, flanked by a raise position and lower position.

The logic controlling the indicators 90, 94, 98 and 102 provides that the indicators 90, 94, 98 and 102 are illuminated if the particular corner of the chassis 12 with which the individual indicator 90, 94, 98 or 102 is associated is sensed as being low. If two of the indicators 90, 94, 98 or 102 are illuminated, that is an indication that the side of the chassis 12 with which the two indicators 90, 94, 98 or 102 are associated is sensed as being both low and level with respect to the parallel opposed side of chassis 12.

Operation of the hydraulic actuation system 20 is understood by reference to FIGS. 4–6. The heart of the hydraulic leveling system is the X and Y level sensors 104, 106, respectively, and the indicator logic switches 108 that together provide feedback to the operator 65 via the indicators 90, 94, 98, and 102. In the preferred embodiment shown, the X and Y level sensors 104, 106 are separate sensors. It is understood that a single, two axis sensor could also be utilized. The X and Y level sensors 104, 106 are preferably pendulum type devices that are mounted on the chassis 12 so that the pendulum contained therein is free to swing along the axis in which it is desired that the respective level sensors 104, 106 measure a level condition. Accordingly, the X and Y level sensors 104, 106 are disposed transverse to one another. The pendulum makes an electrical contact at both ends of its swing, thereby indicating a low condition. No electrical output is generated when the pendulum is disposed between the two ends of the swing, indicating a level condition.

The X level sensor 104 senses level conditions along the longitudinal axis of the mobile stage vehicle 10, from front to rear as indicated in the chassis schematic 110 depicted in FIG. 4. The chassis schematic 110 is similar to the previously described chassis schematic 80. An X minus condition indicates that the front of the mobile stage vehicle 10 is low. An X plus condition indicates that the rear of the mobile stage vehicle 10 is low. No output from the X level sensor 104 indicates that the mobile stage vehicle 10 is level from front to rear.

The Y level sensor 106 operates on the axis of the mobile stage vehicle 10 that is oriented transverse to that of the X level sensor 104. Accordingly, the Y level sensor 106 senses level conditions from side to side of the mobile stage vehicle 10. A Y plus signal from the Y level sensor 106 indicates that the road side of mobile stage vehicle 10 is low. A Y minus signal from the Y level sensor 106 indicates that the curb side of the mobile stage vehicle 10 is low. No output from the Y level sensor 106 indicates that the mobile stage vehicle 10 is level from side to side.

The initial conditions of the hydraulic actuation system 20 are indicated in FIG. 4. Electrical power is applied to this system by rotating the keyed power switch 71 with a key. The presence of electrical power illuminates the power indicator 72. In the initial conditions or in a level condition, the indicator logic switch 108 is as indicated in FIG. 4. In this condition, there is no output from either the X level sensor 104 or the Y level sensor 106. Accordingly, there is no X plus signal at 112, no X minus signal at 114, no Y plus signal at 116, and no Y minus signal at 118. In this condition, the switches immediately to the right of points 112, 114, 116 and 118 of the indicator logic switch 108 remain open. In such open condition, there is no power available to illuminate any of the indicators 90, 94, 98 and 102.

Referring to FIG. 5, the condition in which the rear curb side corner of the mobile stage vehicle 10 is low is depicted. In this condition, the X level sensor 104 is providing an X plus output and the Y level sensor 106 is providing a Y minus output. When an X plus signal is provided to the indicator logic switch 108, the switch immediately to the right of point 112 of the indicator logic switch 108 is closed. The function of the indicator logic switch 108 can be thought of as asking a series of inquiries. The first inquiry in this condition is whether a Y plus signal exists. In this case the answer is in the negative and the switch immediately to the right of point 120 remains open. A further inquiry is made as to whether a Y minus signal exists. In this particular case, a Y minus signal does exist and accordingly the switch immediately to the right of point 122 is closed. Current is then free to flow as indicated by the arrows 124 to illuminate indicator 98, providing an indication to the operator 65 that the rear curbside corner of the mobile stage vehicle 10 is low.

The Y minus signal from Y level sensor 106 also appears at point 118 of indicator logic switch 108. The presence of the Y minus signal closes the switch immediately the right of point 118. The first inquiry is then whether an X minus signal is also present. Since the X minus signal is not present the switch immediately to the right of point 126 remains open. The next inquiry is whether an X plus signal is present. Since the X plus signal is present, the switch immediately to the right of point 128 is closed and current flows as indicated by arrows 130 to join the current flowing through point 112, 122 to illuminate the indicator 98.

Responsive to illumination of indicator 98, the operator 65 actuates toggle switch 96 to raise the curb side rear leveling jack 54c. Raising the curb side rear corner of the mobile stage vehicle 10 acts to extend the length of the jack 54c. As a result of the interdependence of raising a corner of mobile stage vehicle 10 on the level conditions of the adjacent corners, raising the curb side rear corner will first level mobile stage vehicle 10 from front to rear. As a front to rear level condition is achieved, the X plus signal from the X level sensor 104 disappears, leaving only the Y minus signal from the Y level sensor 106. This condition is presented schematically in FIG. 6.

As depicted in FIG. 6, there is no X plus, X minus, or Y plus signal. Accordingly, the switch that is immediately to the right of each of the points 112, 114, and 116 of indicator logic switch 108 remain open. There is, however, a Y minus signal. The Y minus signal results in the switch immediately to the right of point 118 being closed. The first inquiry that is made then is whether there is also an X minus signal. In this case, as previously indicated, there is no X minus signal and accordingly the switch immediately to the right of point 126 remains open. The system also inquiries whether there is an X plus signal. Again in this case, there is no X plus signal, thereby causing the switch immediately to the right of point 128 to remain open. The current is then free to travel through the switches immediately to the left and right of point 132.

The current flows as indicated by the arrow 134 and splits as indicated by the arrows 134a and 134b. The current, as indicated by arrow 134a, illuminates the curb side rear indicator 98. The current, as indicated by arrow 134b, illuminates the curb side front indicator 102. These indications tell the operator 65 that the mobile stage vehicle 10 is level from front to rear, but that the curb side of the mobile stage vehicle 10 is low with respect to the road side thereof. Accordingly, the operator 65 simultaneously activates toggles 96 and 100 to simultaneously lower the curb side rear leveling jack 54c and the curb side front leveling jack 54d, thereby raising the full length of the curb side of the chassis 12 of mobile stage vehicle 10.

When the curb side of mobile stage vehicle 10 is level with the road side thereof, the Y level sensor 106 ceases to send the Y minus signal to the indicator logic switch 108. At this time, the indicator logic switch 108 returns to the configuration as indicated in FIG. 4. When the mobile stage vehicle 10 is level, as indicated by the absence of an X plus, X minus, Y plus, and Y minus signal, the switches to the right of the points 140, 142, 144 and 146 are all closed. Such closing is an indication that the mobile stage vehicle 10 is level.

For embodiments with a canopy 16, a 250 psi switch is in series with the aforementioned switches to the right of the points 140, 142, 144 and 146. The 250 psi switch at point 148 is a feedback from one of the leveling jacks 54 indicating that the jack 54 is in engagement with the ground beneath the mobile stage vehicle 10 and exerting a force of at least 250 psi thereon. This is used as an indicator that the jacks 54 are in fact lowered and in engagement with the ground. The series of switches 140, 142, 144, 146 and 148 are safety interlocks that must be closed prior to raising the canopy 16. These safety interlocks function to require that the mobile stage vehicle 10 be level and that the leveling jacks 54 be in engagement with the ground prior to raising the canopy 16. When such conditions are met, power is supplied to the toggle 78 permitting the operator 65 to either raise or lower the canopy 16. The operator 65 has the option of overriding the aforementioned safety switches by selecting the override 74.

There is an additional safety switch provided at point 150 for embodiments having both a canopy 16 and a hydraulic stage 18. The switch at point 150 stays open until the canopy 16 is deployed to a position such that the arc of motion of the hydraulic stage 18 is unobstructed by the canopy 16. At such time, the switch at point 150 closes providing power to toggle 76 and the operator may hydraulically lower or raise the hydraulic stage 18.

While the preferred embodiment of the present invention has been illustrated and described herein, it is to be understood that the invention is not limited to the precise construction so illustrated and described herein. Accordingly, it is intended that the scope of the present invention be dictated by the scope of the appended claims and not the description of the preferred embodiment.

I claim:

1. A leveling control system for assisting an operator to level a vehicle chassis, the vehicle chassis presenting a longitudinal axis, and a transverse axis, and having a ground-engageable vehicle leveling system, the leveling control system comprising:

sensor means having a first tilt sensor for sensing tilt along the longitudinal axis, the first tilt sensor providing an output signal related to a low front/high rear and a high front/low rear conditions, no signal being provided during front/rear level conditions and a second tilt sensor for sensing tilt along the transverse axis, the second tilt sensor providing output signals related to a low left/high right and a high left/low right conditions, no signal being provided during left/right level conditions;

logic means communicatively coupled to the sensor means for receiving indications of sensed tilt in the longitudinal and transverse axes therefrom;

a control box adapted to be held in an operator's hand, the control box being in signal communication with the logic means, the control box comprising a set of lights observable by the operator, the lights being disposed on the control box in a roughly quadrature pattern with the lights approximately only at the four quadrants of the quadrature and the lights at each quadrant of the pattern being associated with one of the corners of the vehicle chassis, the lights and logic means being electrically associated so that the logic means causes the light associated with one corner of the vehicle to be illuminated when that corner of the vehicle is lower than the other three corners of the vehicle, and the logic means causes illumination of the lights associated with two vehicle corners when the two vehicle corners are level with respect to each other and are also lower than the other two vehicle corners, wherein the logic means is incapable of illuminating two diagonally opposite light, the control box further comprising a set of height controls, the height controls being communicatively connected to a power source and capable of sending a height signal to height-adjusting means that adjust the height of the corners of the vehicle, the height signal being a signal to increase or decrease the height of a vehicle corner, the height controls being activated to send a height signal only in response to manipulation by an operator.

2. A leveling control method for a vehicle chassis, the vehicle chassis presenting a longitudinal axis and a transverse axis, and having a ground-engageable vehicle leveling system, the leveling control method comprising the steps of:

sensing tilt along the vehicle chassis longitudinal axis;

providing a first set of output signals related to a low front/high rear and a high front/low rear conditions, no signal being provided during front/rear level conditions;

sensing tilt along the vehicle chassis transverse axis;

providing a second set of output signals related to a low left/high right and a high left/low right conditions, no signal being provided during left/right level conditions; and performing a logic operation on the output signals, the logic operation causing one indicator to be illuminated when two sets of output signals are provided and causing two indicators to be illuminated when one set of output signals is provided, wherein the logic operation is performed by a logic circuit that does not include a microprocessor.

3. The method of claim 2 further including the step of manually operating an actuator correlated with an indicator when the indicator is providing an operator-discernable low indication, the actuation acting to correct the sensed low condition.

4. The method of claim 3 further including the step of interlocking powered erection of at least one selected component mounted on the vehicle chassis unless ground engagement of the vehicle levelling system is sensed.

5. The method of claim 4 further including the step of interlocking powered erection of at least one selected component mounted on the vehicle chassis unless a level vehicle chassis condition is sensed.

6. The method of claim 4 further including the step of serially communicatively connecting a vehicle chassis level interlock and a vehicle levelling system ground engagement interlock.

7. A leveling control system for assisting an operator to manually level a vehicle chassis, the vehicle chassis presenting a first axis, and a transverse axis, the intersection of said first axis and said transverse axis defining four quadrants of said chassis, and having a ground-engageable jack associated with each of said four quadrants, comprising:

a first level sensor oriented generally along said first axis, and a second level sensor oriented generally along said transverse axis, said sensors providing signals indicating the relative elevation of the chassis sides along their respective axes;

a handheld display operably coupled to said sensors, said display having a depiction of the vehicle chassis and including an indicator associated with each quadrant of the depiction of the vehicle chassis, said handheld display further including operator actuated switches, each switch being operably coupled to one of the jacks for selective actuation of the jacks; and a logic circuit that accepts input from the level sensors and sends output to activate the display indicators, the logic circuit being configured to perform logical steps on the input and selectively activate the indicators to show the elevation of the quadrants relative to each other.

8. The leveling control system of claim 7 having four quadrants, each quadrant corresponding to the chassis right front, left front, right rear, or left rear; with the first level sensor providing input to the logic circuit consisting of a front low input, a rear low input, or no input and the second level sensor providing input to the logic circuit consisting of a right side low input, a left side low input, or no input; wherein the logic circuit is adapted to send output that activates display indicators according to the following input-output table:

| Input signal: | | | | Output signal to quadrant |
|---|---|---|---|---|
| Rear low | Front low | Left side low | Right side low | corresponding to: |
| none | none | none | none | none |
| none | none | none | YES | Right front; Right rear |
| none | none | YES | none | Left front; Left rear |
| YES | none | none | none | Right rear; left rear |
| YES | none | YES | none | Left rear |
| YES | none | none | YES | Right rear |
| none | YES | none | none | Left front, Right front |
| none | YES | YES | none | Left front |
| none | YES | none | YES | Right front. |

9. The leveling control system of claim 8 wherein the logic function of the logic circuit is performed by essentially sixteen electrical switches.

* * * * *

UNITED STATES PATENT AND TRADEMARK OFFICE
CERTIFICATE OF CORRECTION

PATENT NO. : 6,176,495 B1
DATED : January 23, 2001
INVENTOR(S) : Decker

It is certified that error appears in the above-identified patent and that said Letters Patent is hereby corrected as shown below:

Column 3,
Line 46, delete "along side" and insert -- alongside --.

Column 4,
Line 23, delete "a" and insert -- an --.

Column 6,
Line 17, after "immediately" insert -- to --.
Line 47, delete "inquiries" and insert -- inquires --.

Column 7,
Line 51 and 55, delete "conditions," and insert -- condition, --.

Column 8,
Line 13, delete "light," and insert -- lights, --.
Lines 29 and 34, delete "conditions," and insert -- condition, --.

Column 10,
Line 14, "left" should be initially capitalized.

Signed and Sealed this

Twenty-eighth Day of August, 2001

*Attest:*

NICHOLAS P. GODICI
*Attesting Officer*      Acting Director of the United States Patent and Trademark Office